US00RE37634E

(19) United States
(12) Reissued Patent
Hickman et al.

(10) Patent Number: US RE37,634 E
(45) Date of Reissued Patent: Apr. 9, 2002

(54) TWO-FLAP CLOSURE

(75) Inventors: John R. Hickman, Talmadge; Craig C. Weidman, Wooster; Nickolas J. Kriska, Uniontown, all of OH (US)

(73) Assignee: Weatherchem Corporation, Twinsburg, OH (US)

(21) Appl. No.: 08/731,975

(22) Filed: Oct. 23, 1996

Related U.S. Patent Documents

Reissue of:
(64) Patent No.: 4,693,399
Issued: Sep. 15, 1987
Appl. No.: 06/920,566
Filed: Oct. 17, 1986

U.S. Applications:

(63) Continuation-in-part of application No. 06/899,935, filed on Aug. 25, 1986, now Pat. No. Des. 305,206.

(51) Int. Cl.[7] ..... B67D 3/00
(52) U.S. Cl. ..... 222/480; 220/254; 220/826; 215/235; 215/237
(58) Field of Search ..... 222/480, 485, 222/556, 545; D9/449, 336; 220/254, 791, 309.2, 339; 215/235, 237

(56) References Cited

U.S. PATENT DOCUMENTS

| | | | | | |
|---|---|---|---|---|---|
| 3,493,150 | A | * | 2/1970 | Lucas et al. | 222/480 |
| 4,163,496 | A | * | 8/1979 | Dogliotti | 220/339 |
| 4,223,814 | A | * | 9/1980 | Sneider | 222/565 |
| 4,284,200 | A | * | 8/1981 | Bush et al. | 222/480 X |
| 4,361,250 | A | * | 11/1982 | Foster | 220/254 |
| 4,369,901 | A | * | 1/1983 | Hidding | 222/151 |
| 4,463,869 | A | * | 8/1984 | Lewis | 220/339 |
| 4,494,679 | A | * | 1/1985 | Cleevely | 220/254 |
| D278,602 | S | * | 4/1985 | Rosenstein | D9/449 |
| 4,545,508 | A | * | 10/1985 | Cribb, Jr. et al. | 222/556 |
| 4,580,687 | A | * | 4/1986 | Lewis | 220/254 |
| D305,206 | S | * | 12/1989 | Hickman et al. | D9/449 |
| 4,936,494 | A | * | 6/1990 | Weidman | 222/480 X |

OTHER PUBLICATIONS

Opinion & Order, Ang. 30, 1996.
Motion Under Rule 52(b) by Weatherchem (On–Sale).
Memorandum in Support of Weatherchem's Motion Under Rule 52(b) (On–Sale).
Motion Under Rule 52(b) By Weatherchem (Number of Ribs).
Memorandum in Support of Weatherchem's Motion Under Rule 52(b) (Number of Ribs).
J. L. Clark's Memorandum in Opposition to Weatherchem's Motion Under Rule 52(b) (On–Sale).
J. L. Clark's Memorandum in Opposition to Weatherchem's Motion Under Rule 52(b) (Number of Ribs).
Weatherchem's Reply to Clark's Opposition of the Rule 52(b) Motion (On–Sale).
Weatherchem's Reply to Clark's Opposition of the Rule 52(b) Motion (Number of Ribs).
Opinion and Order dated Sep. 29, 1997.
Defendants Trial Exhibit 1165 CA#1:91CV0035.

* cited by examiner

*Primary Examiner*—Joseph A. Kaufman
(74) *Attorney, Agent, or Firm*—Pearne & Gordon LLP

(57) ABSTRACT

An injection-molded thermoplastic closure with shake-and-spoon apertures and associated flaps for selectively closing and opening the apertures. The flaps are releasably retained in their closed positions by catch elements which provide retention forces that are relatively insensitive to dimensional and shape variations in the body resulting from the molding process. In one embodiment, the cap has "freeze points" and a gate location that reduce the tendency of the cap to assume an oval condition when cooled from molding temperatures. A wide sealing ledge cooperates with a central support for a liner seal positioned in the cap to seal the mouth of a container.

51 Claims, 4 Drawing Sheets

TWO-FLAP CLOSURE

Matter enclosed in heavy brackets [ ] appears in the original patent but forms no part of this reissue specification; matter printed in italics indicates the additions made by reissue.

*This is a continuation-in-part of application Ser. No. 899,935, filed Aug. 25, 1986, now U.S. Pat. No. Des. 305.206.*

BACKGROUND OF THE INVENTION

The invention relates to closures for containers, and more particularly to injection-molded plastic closures with hinged reclosable flaps.

PRIOR ART

Shake-and-spoon closures for dispensing condiments and the like are generally known in the industry. Typically, such closures take the form of round caps with a pair of semicircular or nearly semicircular flaps. One flap selectively closes and opens a plurality of relatively small apertures for shaking or sifting a pourable product from the container. The other flap selectively closes and opens a relatively large opening in the cap used for spooning product out of the container. Often the cap includes an internally threaded skirt which mates with threads on the mouth of a container for purposes of securing the closure to the container.

In certain prior art shake-and-spoon closures of the type described, the spoon opening has been limited to less than half of the mouth opening of the container. This restricted size can be inconvenient in certain instances, such as in commercial establishments and institutions where relatively large spoons are used by a cook. A more subtle problem with shake-and-spoon closures faceed by the manufacturer is the tendency of the closure to take an out-of-round or oval set when released from the mold. The cause of this ovality is the non-symmetry of the cap to an absence of plastic stock on one side of the closure where the spoon aperture exists and substantial stock on the other side exits to surround the small shake apertures. Because of the non-symmetry of the plastic mass, thermal shrinkage is uneven. Resultant ovality can detract from the appearance of the container and closure, cause problems in automatic container capping machines, make it difficult to achieve a good seal with the mouth of the container, and increase the difficulties of providing reliable retention of the flaps in the closed positions. In general, each of these problems tends to be aggravated where the size of the spoon aperture is increased at the expense of the cap area allotted to the shake apertures. Certain prior art closures have included a rib on the spoon flap parallel to the hinge that functions to stiffen the flap and contributes to the sealing action on the spoon aperture. This rib can have the disadvantage of obstructing, and thereby lessening, the effective size of the spoon aperture.

SUMMARY OF THE INVENTION

The invention provides an injection-molded plastic shake-and-spoon closure which has a proportionately large, unrestricted spoon aperture, and which reduces quality-related problems found in prior art products. The closure includes novel catch means associated with the aperture cover flaps that produce consistent retention and release action and is relatively tolerant of dimensional variations due to thermal shrinkage and any tendency towards ovality of the molded parts. In accordance with the invention, the flaps are formed with a wall thickness substantially equal to the nominal wall thickness of the remainder of the closure and are devoid of heavy stiffening ribs. The non-rigid flap structure permits it to be opened in a peeling motion so that the forces of individual catches are encountered progressively as the flap is opened, whereby the high total retention force need not be overcome at once. The disclosed closures include a wide internal sealing ledge which ensures that the closure will positively seal the mouth of a container, regardless of any expected degree of ovality. A land area between the spoon and shake apertures has the same elevation as the sealing ledge. This land area can provide support for intermediate areas of a paper seal which can be particularly important when the seal is stamped into the closure by automatic high speed equipment.

DESCRIPTION OF THE PREFERRED EMBODIMENTS

Figure 1:
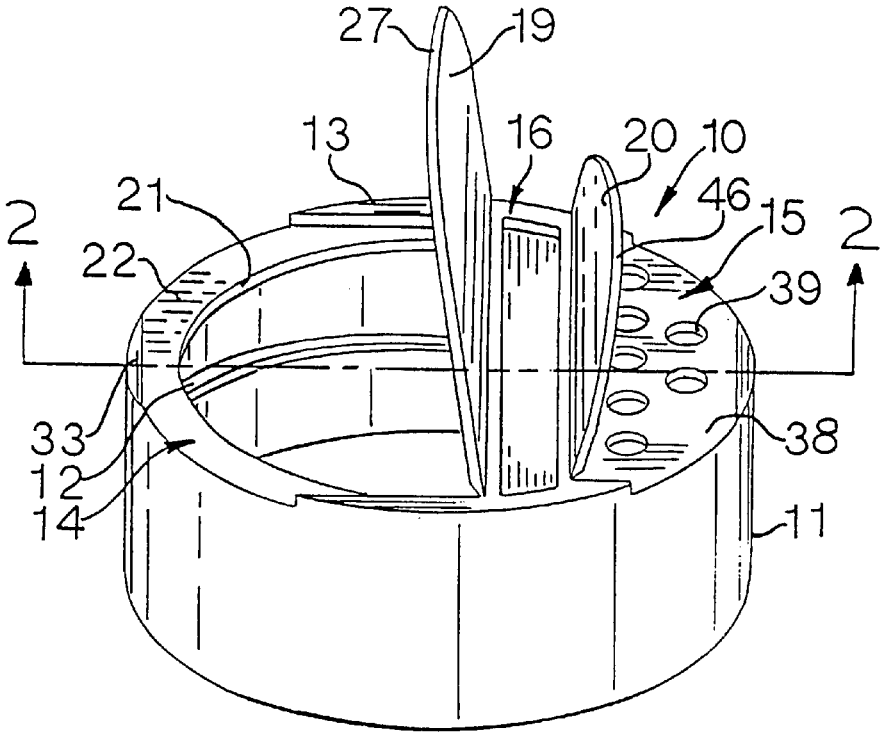
FIG. 1 is a perspective view of a first embodiment of a two-flap dispensing closure constructed in accordance with the invention.
Figure 4:
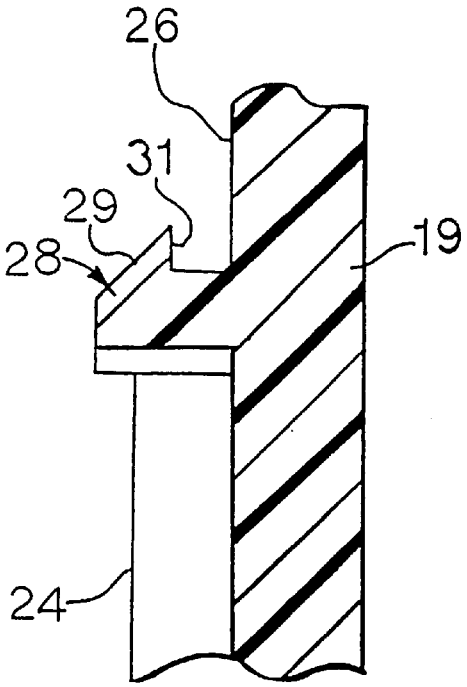
FIG. 4 is a fragmentary cross-sectional view of an area of a spoon flap taken in the plane indicated by the lines 4—4 in FIG. 3.
Figure 5:
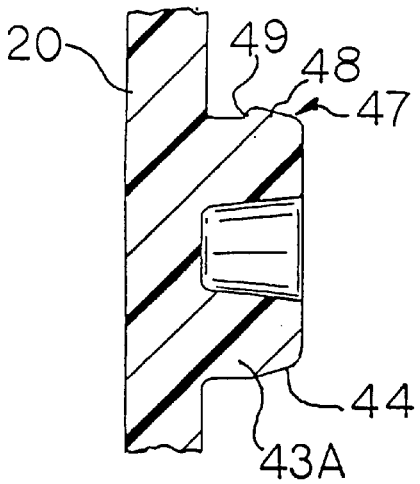
FIG. 5 is a fragmentary, cross-sectional view of an area of a shake flap taken in the plane indicated by the lines 5—5 in FIG. 3.
Figure 3:
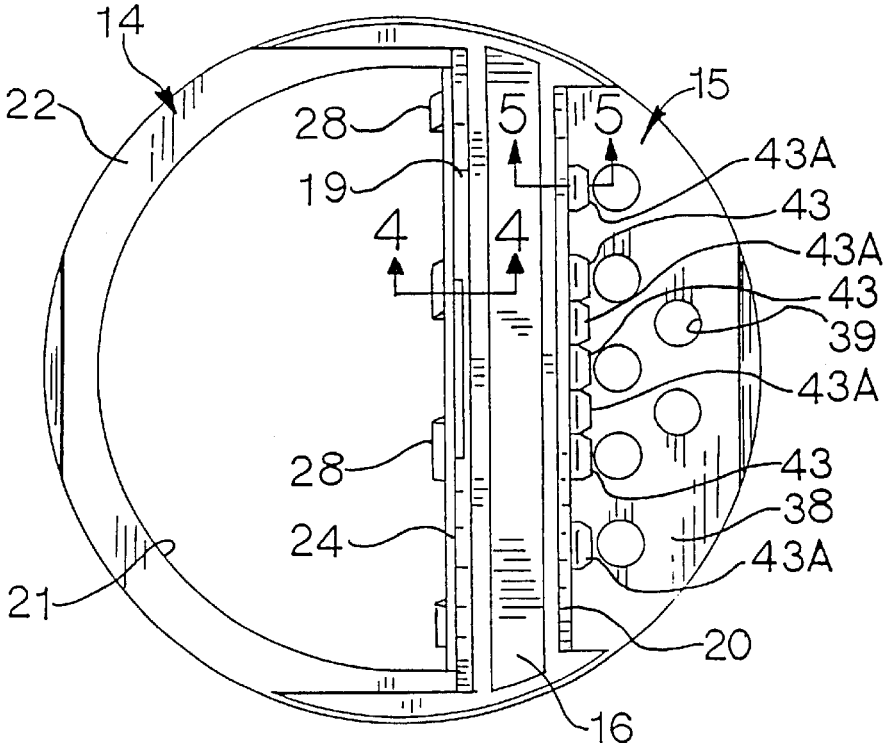
FIG. 3 is a top plan view of the closure of FIG. 1.

Referring now to the drawings, a first embodiment of a two-flap closure or cap 10 constructed in accordance with the invention is shown in FIGS. 1 through 6. The cap or closure 10 is arranged to dispense pourable material in either a spoon or a shake mode from a container (not shown) on which it is mounted. The cap 10 is a unitary injection-molded plastic part, preferably formed of thermoplastic material such as polypropylene. The cap 10 is circular in plan view and includes a cylindrical tubular skirt 11. Screw threads 12 on the interior of the skirt 11 mate with external screw threads on the mouth of a container for the purpose of mounting the cap 10 to the container. An end wall 13, bounded by the skirt 11, is divided into spoon and shake sections 14, 15 by a chordal land area 16. In the illustrated case, the spoon section 14 is considerably larger than the shake section 15, their respective areas roughly representing a division of the end wall 13 by two-thirds for the spoon section and one-third for the shake section.

Each of the spoon and shake sections 14, 15 has an associated flap 19, 20 that covers the major part of its respective section. The spoon section 14 includes a D-shaped aperture 21 of generous proportions. The aperture 21 is bounded by an arcuate planar ledge or flange 22 that extends radially inwardly from an upper end of the skirt 11. The outward profile of the ledge 22 is generally D-shaped and corresponds to a D-shaped outer profile of the spoon flap 19.

The spoon flap 19 is integrally joined to the chordal land area 16 by a living hinge 23. The hinge 23 is formed by a relatively thin wall section extending in a straight line across a fixed edge 25 of the flap 19 adjoining an edge of the land 16. An arcuate sealing lip 24 is provided on a lower face 26 of the spoon flap 19. The lip 24 is spaced inwardly from the free edge, designated 27, of the spoon flap 19, and is arranged, when the flap is closed, to fit closely adjacent the arcuate edge of the spoon aperture 21 to avoid sifting of material out of the container at this point. The cross section of the lip 24, aside from a plurality of associated, spaced catches 28, is relatively small in cross section to avoid significant flexural stiffening of the spoon flap 19.

As shown, the lip depth and thickness are not significantly greater in dimension than the nominal wall thickness of the entire cap 10. In the illustrated case, for example, the nominal wall thickness of the cap is 0.050 inch, the lip depth is 0.079 inch, and the lip thickness is 0.035 inch. The lip 24 runs parallel to the free edge 27 of the flap 19 and is absent along the fixed line of the hinge 23.

Figure 6:
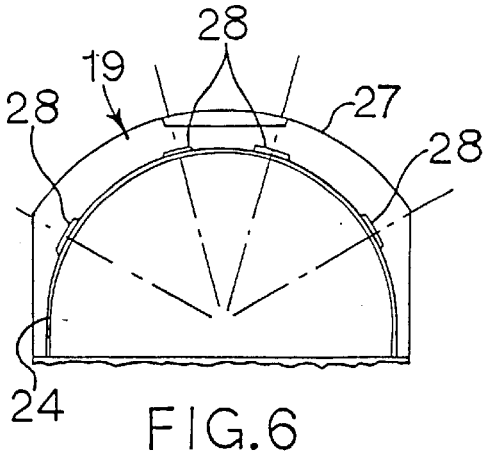
FIG. 6 is a fragmentary view of the underside of the spoon flap of the closure of FIG. 1.

The spoon flap or lid 19 is retained in a closed position with its lower face 26 against the ledge 22 by the catches 28, which grip the underside 32 of the ledge. A typical catch 28 is illustrated in section in FIG. 4. The catch 28 is spaced from the plane of the flap 19 and projects outwardly from the lip 24 in a direction away from the hinge 23 to provide a camming surface 29 and a gripping surface 31. The camming surface 29 lies in a plane oblique to the plane of the flap 19, while the gripping surface 31 is in a plane generally parallel to the flap. The catches 28 are substantially identical and are four in number. As seen in FIG. 6, the catches 28 are spaced along the lip 24 in such a manner that their total extent and that of the arcuate spaces intervening them is substantially at least as great as one-half of the arcuate or lengthwise extent of the lip. Preferably, the lip 24 is on a circular arc and the included angle between the centers of the outwardmost catches 28 is greater than 90 degrees and is preferably 120 degrees. This relationship, in conjunction with the construction of remaining parts of the closure 10, has been found to provide satisfactory retention of the flap 19 in its closed position. As the flap 19 is closed, the camming surfaces 29 engage the edge of the aperture 21 and resiliently deflect their catches 28 away from such edge until the gripping surfaces 31 are permitted to catch an underside 32 of the ledge 22. The spacing of the gripping surface 31 from the underside 26 of the spoon flap 19 is preferably arranged to develop a slight interference fit with the vertical thickness of the ledge 22 so that the catches 28 maintain the underside of the flap 19 tight against the ledge 22. The ledge 22 is beveled at 33 to provide fingernail access to the underside of the flap 19 at a point 34.

The shake flap 20, like the spoon flap 19, is integrally joined to the chordal land area 16 by a living hinge 36 extending in a straight line across a fixed edge 37 of the flap and the land area. The flap 20 has a D-shaped profile in plan view. The shake section 15 includes a web 38 which underlies the flap 20 and has a configuration generally corresponding to the profile of the flap. The web 38 has a plurality of spaced, preferably round apertures 39 suitable for dispensing material by sifting or shaking from the assembled container. The shake flap 20 has a plurality of hollow plugs 43 arranged in a pattern which corresponds to that of the apertures 39 so that when the flap is closed against the web 38, each of the plugs 43 is received in a respective aperture 39. Ideally, each plug 43 has the shape of an inverted, generally circular cup, and is dimensioned to fit tight enough in its respective aperture to prevent sifting when the flap is closed. Lower ends of the plugs 43 are tapered at 44 to facilitate entry into the apertures 39 when the flap is closed.

A plurality of the plugs 43, in the illustrated case, those proximal to a free edge 46 of the flap 20 and identified with the suffix "A", are shaped with individual catch means 47. The plug catch means 47 includes a conical camming surface 48 and a gripping area or undercut 49. The camming surface 48 and gripping area 49 are centered on an axis eccentric from the axis of the associated plug 43 so that they exist only on a side of the plug remote from the hinge 36. The camming surfaces 48 work against the edges of the apertures 39 to allow the catch means 47 to slip under the web 38. The catch gripping area 49 of each associated plug 43 engages the underside of the web 38 to releasably retain the flap 20 in its closed position, resting on the web 38.

The disclosed cap 10 features a relatively large spoon aperture 21 in proportion to the total plan area of the cap, which is a convenience particularly at commercial or institutional sites where large spoons may be used. The large spoon opening 21 presents difficulty in the manufacture of the cap because it tends to induce the cap to assume an oval shape when released from the mold and cooled to ambient temperature. This tendency is a result of the non-symmetry or balance of material in the plane of the end wall 13 introduced by the aperture 21. The cap material cools from molding temperatures in an uneven manner, and consequently sets in an unintended oval condition. Parts produced in a multi-cavity mold typically exhibit other dimensional variations which add to the difficulties faced by the manufacturer of the cap in producing parts of consistent performance. The tendencies to assume an oval shape and exhibit variations in size present potentially serious difficulties in producing a cap with flaps that snap closed and open with application of moderate manual forces.

Dimensional or shape variation in a cap can potentially make the flap retention forces too high or too low. The disclosed cap construction provides a structure in which the cap opening and closing forces are advantageously relatively insensitive to normally expected size or shape variations. The spoon flap 19, despite its relatively large size, is retained in its closed position, with its underside 26 resting on the ledge 22 by the series of catches 28 spaced on the line of the lip 24 parallel to the free edge 27 of the flap. Once closed, the total force holding the flap 19 is the sum of the retention forces of the individual catches 28. This total force can be relatively high by suitably dimensioning the catches 28 to resist accidental opening of the flap 19 during shipment or handling of the container. The opening forces encountered by the user are relatively low, since, in accordance with the invention, the flap 19 can be progressively opened, one or two catches at a time, in a peeling fashion. The flap 19, being relatively thin and devoid of any stiffening structure but for the lip 24, which is relatively small in cross section, can flex about axes of curvature both perpendicular and parallel to the hinge 23. Thus, an opening force supplied to the underside of the flap 19 in the area of the bevel 33 is effective to unsnap one or both of the adjacent catches 28, while flexure of the flap allows the catches remote from the bevel to temporaily remain latched. Further application of lifting force, but not necessarily at substantially higher values, causes the catches 28 remote from the bevel 33 to snap and release their holds.

Preferably, the flap 19 is flexible enough in relation to the retention forces of the catches 28 to allow it to assume a static condition, with the outward catches under the ledge 22 and the inward catches over the ledge. This capability demonstrates the peelability of the flap 19, where the central catches can be first released by flexing the flap and then the remaining catches can be released by continued lifting force on the flap. The disclosed spacing of the catches 28 along a line that is a substantial portion of the length of the free edge 27 of the flap 19 ensures that the flap is retained uniformly throughout its full area. The effects of any unintentional ovality in the shape of the cap 10 on the security of the flap 19 are reduced, since the flap is held closed by the catches 28 at a plurality of points and their redundancy offers a safety factor where at least some of the catches will fit snugly against an adjacent edge of the aperture 21.

The individual catches 28 can be normally dimensioned to provide a relatively large interference fit at local points on the aperture 21 to ensure that at least some retention force to maintain the flap closed is available where unintentional ovality occurs in a cap and reduces the actual interference fit of the catch 28 from a nominal or desired degree of interference. Even where unintended ovality in a cap 10 increases the interference of the fit of a catch 28, a user will not experience excessive resistance to opening or closing of the flap. Since the flap is devoid of substantial rigidifying structure, it can resiliently buckle or flex to allow the catches 28 to pass over the edge of the aperture 21. From the above discussion, it is seen that the spoon flap 19 and associated catches 28 are dimensionally forgiving or tolerant of manufacturing variation in size and shape.

The shake flap 20 is releasably retained in a closed position against the web 38 by the plug catch means 47. The catches 47 are dimensionally tolerant in a manner similar to that of the catches 28 on the spoon flap 19 such that dimensional variations, including unintended ovality, are tolerated without excessive or marginal forces being experienced in opening or closing the flap. The flap 20 is relatively flexible, having a thickness generally equal to the nominal wall thickness of the cap and being devoid of auxiliary ribs or other stiffening structure. In ways similar to the catches 28 on the spoon flap 19, the catches 47 provide a degree of safety of closure from their redundancy. The distribution of retention points across a major portion of the area of the flap 20 ensures that the flap will be held down across its full extent to resist sifting. With its capacity to buckle or flex slightly, the flap 20 can permit opening or closing movement of the plug catches 47 in and out of their respective apertures without the need for excessive manual effort. The resilient flexibility of the flap 20 is demonstrated by its ability to have a single catch 47 or a limited number of catches to be caught in a respective aperture or apertures while remaining plugs are not caught in their respective apertures.

Figure 2:
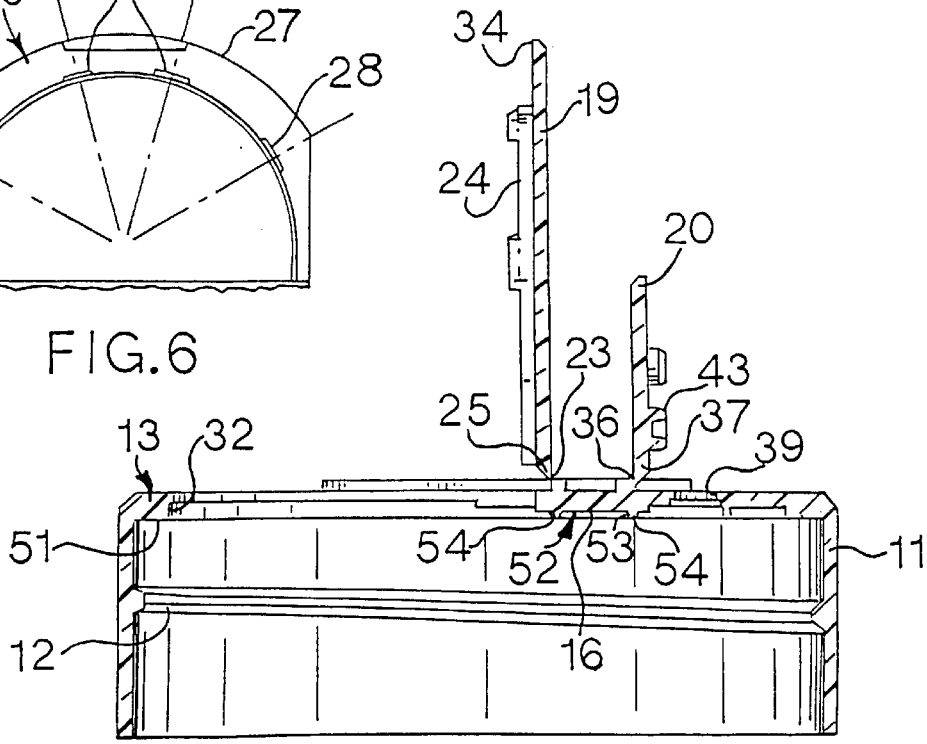
FIG. 2 is a cross-sectional view of the closure of FIG. 1, taken in the vertical plane indicated by the lines 2—2 of FIG. 1.
Figure 7:
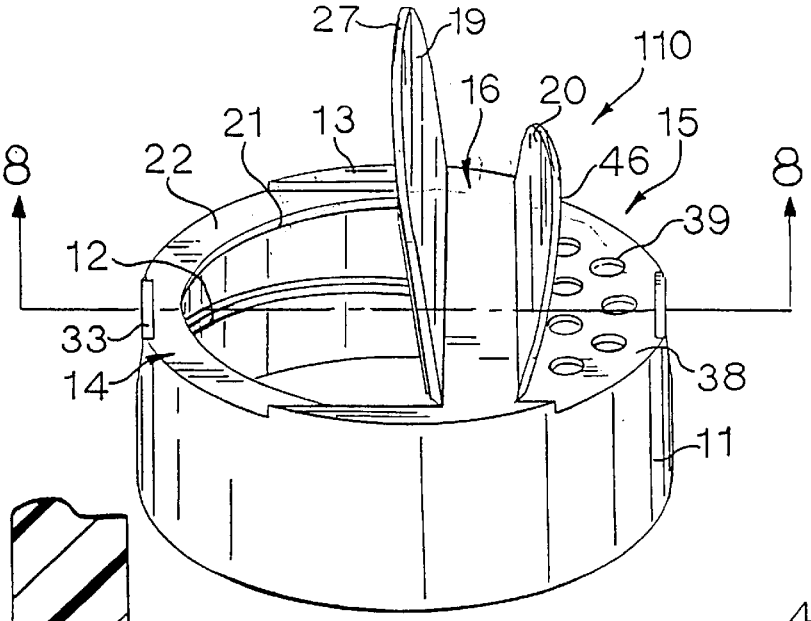
FIG. 7 is a perspective view of a second embodiment of a two-flap dispensing closure constructed in accordance with the invention.
Figure 10:
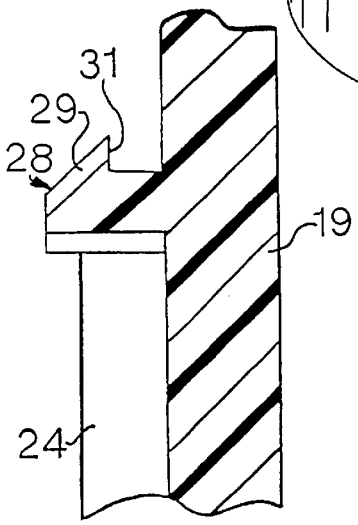
FIG. 10 is a fragmentary, cross-sectional view of an area of a spoon flap taken in the plane indicated by the lines 10—10 in FIG. 9.
Figure 11:
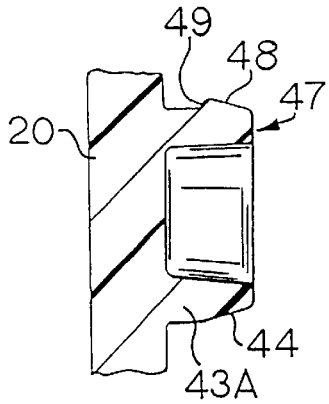
FIG. 11 is a fragmentary, cross-sectional view of an area of a shake flap taken in the plane indicated by the lines 11—11 in FIG. 9.

As suggested in FIG. 2, the spoon flap 19 is readily opened fully into a vertical plane to avoid obstruction of the aperture 21. The flap 19 is free of any extension of the lip 24 along the hinge 23, which could reduce the effective size of the aperture 21. As shown in FIG. 2, the lower or inside face of the end wall 13 includes an annular sealing ledge 51. The ledge 51 is generally planar and is relatively wide in the radial direction, preferably having a radial dimension generally equal to twice the nominal wall thickness of the cap 10. The relatively wide extent of the ledge 51 ensures that the cap 10 will produce a reliable seal on the mouth of a container on which it is assembled, despite any expected degree of ovality. A lower face 52 of the land area 16 includes a pair of ribs 53 parallel to the hinges 23. 36. Lower surfaces 54 of the ribs 53 are coplanar with the sealing ledge 51 and help support any paper, foil, or like sealing film stamped or otherwise set into the cap 10 prior to assembly with its container.

Figure 12:
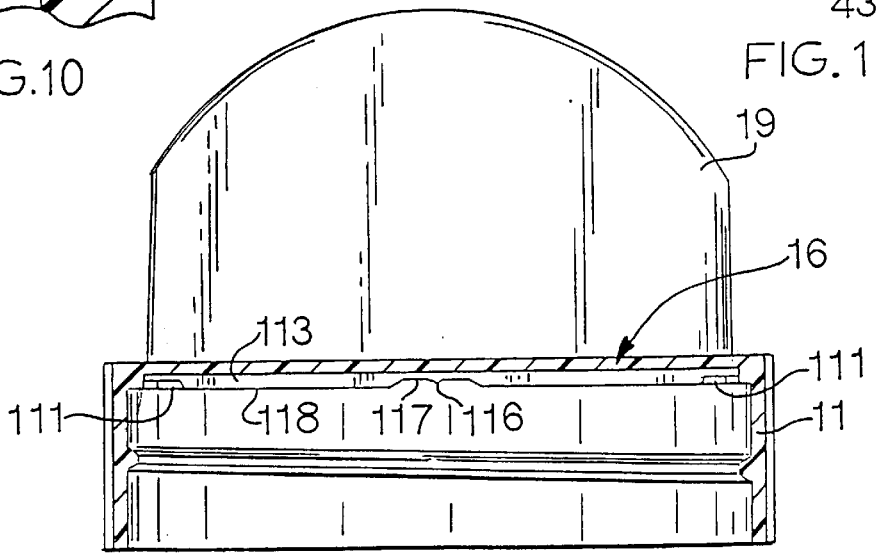
FIG. 12 is a cross-sectional, elevational view of the closure of FIG. 7 taken in the plane indicated by the lines 12—12 in FIG. 9.
Figure 9:
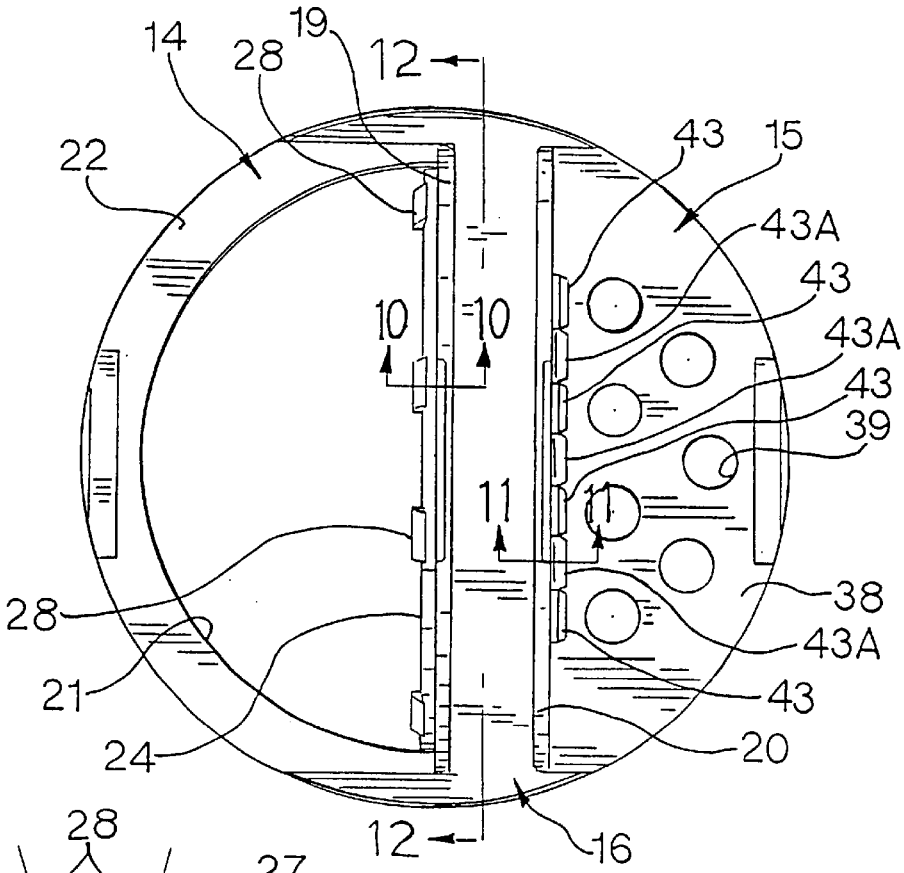
FIG. 9 is a top plan view of the closure of FIG. 7.
Figure 13:
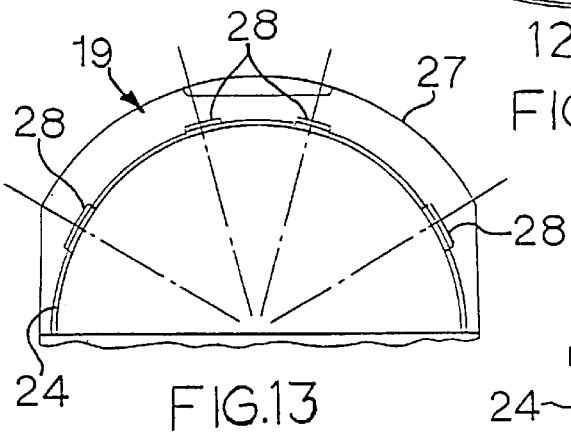
FIG. 13 is a fragmentary view of the underside of the spoon flap of the closure of FIG. 7.
Figure 8:
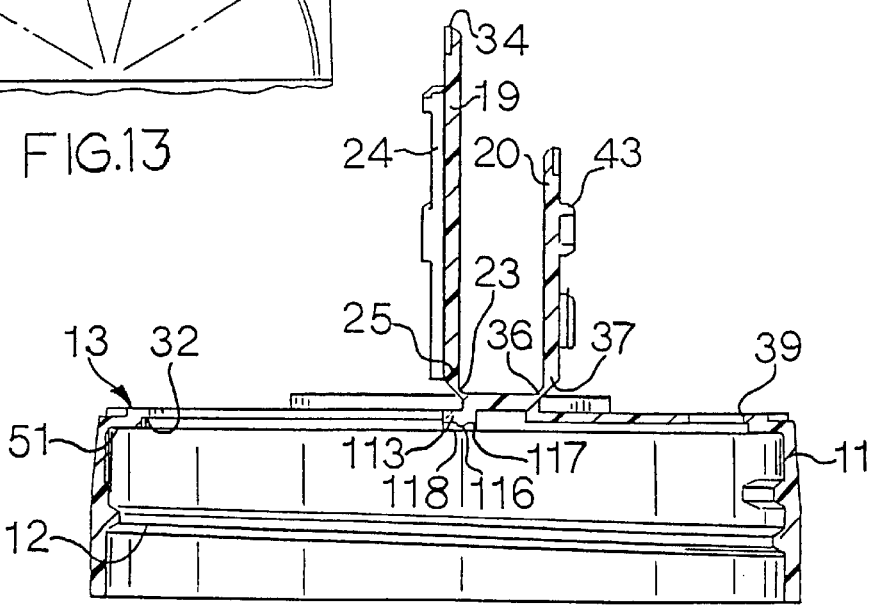
FIG. 8 is a cross-sectional view of the closure of FIG. 7 taken in the vertical plane indicated by the lines 8—8 in FIG. 7.

A second embodiment of the invention is illustrated in FIGS. 7 through 13. In this second embodiment, elements of a cap 110 having the same general structure and function as elements of the cap 10 of FIGS. 1 through 6 have been designated by identical numerals. The cap 110 includes means indicated generally at 111 to reduce its tendency to set into an oval configuration upon release from a mold, cooling, and thermal shrinkage. The ovality reducing means 111 comprises reduced wall thickness zones at opposite ends of a chordal land area 16'. As indicated in FIGS. 8 and 12, the land area 16' includes a bar-like rib 113 extending lengthwise of the land 16'. The rib or bar 113 has a relatively heavy cross section in the majority of its length along the land 16'. As seen in FIG. 12, the areas 111 have substantially less thickness, measured vertically, than that of the rib 113.

It is believed that these reduced wall thickness areas or zones 111 form "freeze points" at which relatively quick setting of molten plastic material occurs during the molding cycle. Further, it is believed that the quick setting of material at these points tends to lock or spatially fix the body of the cap 110 at these points and force any subsequent thermal shrinkage to occur elsewhere as a sink in the bar 113 or other parts of the body of the cap which do not directly produce ovality and which, in practice, are essentially visually imperceptible.

The cap or closure 110 is molded with a gate at the midlength of the underside of the rib 113 of the land 16'. A vestige 116 of the gate is illustrated in FIGS. 8 and 12. This central location of the gate also contributes to a reduction in the tendency of the cap to assume an unintended oval configuration. The rib 113 is locally recessed vertically upwardly in an area 117 surrounding the gate vestige 116 to ensure that the vestige breaks off at an elevation above a surrounding lower face 118 of the rib 113 and the sealing ledge 51. With the gate vestige recessed above the plane of the rib face 118, there is no risk that a circular paper seal received in the cap 110 against the sealing edge 51 will be punctured by the vestige 116.

While the invention has been shown and described with respect to particular embodiments thereof, this is for the purpose of illustration rather than limitation, and other variations and modifications of the specific embodiments herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

What is claimed is:

1. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, each of said sides having an associated hinged flap, the flap of the shake side being arranged to selectively close relatively small apertures, the flap of the spoon side being arranged to selectively close said relatively large aperture, the spoon flap having a free edge defining with the line of the associated hinge substantially the full boundary of the spoon flap, the spoon flap including catch means spaced along a line adjacent its free edge, the catch means being arranged to releasably secure the spoon flap in a closed position relative to the spoon aperture and extending along said adjacent line a distance substantially at least as great as one-half of the length of the free edge whereby the Flap is uniformly retained along its free edge.

2. A dispensing cap as set forth in claim 1, wherein said catch means comprise discrete elements spaced from one another along said free edge.

3. A dispensing cap as set forth in claim 2, wherein said catches have a length which is smaller than the spacing between them.

4. A dispensing cap as set forth in claim 1, wherein said adjacent line is a generally circular arc and said catch means subtend an arc on said adjacent line through an angle in excess of 90 degrees.

5. A dispensing cap as set forth in claim 2, wherein said catches engage an edge of the spoon aperture.

6. A dispensing cap as set forth in claim 5, wherein said spoon flap includes a marginal area that extends outwardly of said spoon aperture.

7. A dispensing cap as set forth in claim 6, wherein said spoon flap includes a thin skirt adapted to cooperate with said spoon aperture to avoid sifting of product through said spoon aperture when said spoon flap is in a closed condition.

8. A dispensing cap as set forth in claim 7, wherein said catches are disposed on said thin skirt.

9. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, each of said sides having an associated hinged flap, the flap of the shake side being arranged to selectively close or open relatively small apertures, the flap of the spoon side being arranged to selectively close or open said relatively large aperture, one of said flaps having a generally uniform wall thickness not substantially greater than the nominal wall thickness of the remainder of the cap and being free of significant stiffening structure, a plurality of individual catch means spaced on a lower face of the flap, the catch means being arranged to releasably secure the flap in a closed position, the flap being sufficiently flexible to allow it to be peeled open manually by overcoming the retention forces of said catch means progressively with the force of fewer than all of the catches being overcome at any given time.

10. A dispensing cap as set forth in claim 9, wherein said spoon flap includes said catch means spaced along a line adjacent its free edge, said catch means being arranged to engage the edge of said spoon aperture.

11. A dispensing cap as set forth in claim 9, wherein said shake flap includes plug elements arranged to fit into said small apertures, said catch means being provided on said plug elements and being adapted to engage said small apertures.

[12. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, a chordal land area between the spoon and shake sides, each of said sides having an associated flap hinged on said land, the flap of the shake side being arranged to selectively close or open said relatively small apertures, the flap of the spoon side being arranged to selectively close said relatively large aperture, an internally threaded skirt depending from the perimeter of said end wall, an annular sealing ledge on the lower side of the end wall interior of said skirt, the land area having a lower surface generally coplanar with said sealing ledge and adapted to cooperate with said sealing ledge to support a sealing sheet received in said cap.]

[13. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, each of said sides having an associated hinged flap, the flap of the shake side being arranged to selectively close or open relatively small apertures, the flap of the spoon side being arranged to selectively close said relatively large aperture, an internally threaded skirt depending from the perimeter of said end wall, an annular sealing ledge on the lower side of the end wall interior of said skirt, the sealing ledge having a flat surface extending radially a distance substantially equal to at least twice the nominal wall thickness of the cap.]

14. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, a chordal land area between the spoon and shake sides, each of said sides having an associated flap hinged on said land, the flap of the shake side being arranged to selectively close or open relatively small apertures, the flap of the spoon side being arranged to selectively close said relatively large aperture, the thickness of the cap at the ends of the land area being substantially less than the average thickness of the land area whereby the plastic material in such end areas freezes at a relatively early stage in a molding cycle to reduce the tendency of the cap to assume an oval condition.

15. A dispensing cap as set forth in claim 14, the lower face of the chordal land area having a recessed area surrounding a gate vestige point, the axial depth of its recess being of sufficient depth to ensure that the gate vestige is above surrounding areas of the chordal land area.

*16. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, a chordal land area between the spoon and shake sides, each of said sides having an associated flap hinged on said land, the flap of the shake side being arranged to selectively close or open said relatively small apertures, the flap of the spoon side being arranged to selectively close said relatively large aperture, an internally threaded skirt depending from the perimeter of said end wall, an annular sealing ledge on the lower side of the end wall interior of said skirt, the land area having a lower surface generally coplanar with said sealing ledge and adapted to cooperate with said sealing ledge to support a sealing sheet received in said cap, and catch structure for releasably retaining the spoon flap closed against accidental opening, the catch structure including surface area that produces a gripping action between an area on the end wall and an area on the spoon flap when the spoon flap is closed, the spoon flap area engaged in the gripping action underlying the end wall area engaged in the gripping action and thereby creating an axially interfering fit to hold said spoon flap closed.*

*17. A dispensing cap as set forth in claim 16, wherein said catch structure includes surface area arranged in a manner such that the catch structure is relatively tolerant of dimensional variations due to a tendency towards ovality.*

*18. A dispensing cap as set forth in claim 17, wherein the catch structure is dimensioned to provide a relatively large interference fit between an area of the end wall and an area of the spoon flap.*

*19. A dispensing cap as set forth in claim 16, wherein the end wall area engaged in the gripping action is complementary in form to the spoon flap area engaged in the gripping action.*

*20. A dispensing cap as set forth in claim 16, wherein the spoon flap area engaged in the gripping action, when the spoon flap is closed, and the end wall area engaged in the gripping action lie in generally radial planes.*

*21. A dispensing cap as set forth in claim 16, wherein the area of the end wall engaged in the gripping action is adjacent an edge of the end wall forming the spoon opening.*

*22. A dispensing cap as set forth in claim 16, wherein the catch structure is on the spoon flap.*

*23. A dispensing cap as set forth in claim 16, wherein the sealing ledge is formed by an underside of an area of the end wall having a thickness greater than other areas of the end wall.*

*24. A dispensing cap as set forth in claim 16, wherein areas of the end wall radially inward of the sealing ledge have a thickness less than an area of the end wall overlying the sealing ledge.*

*25. A dispensing cap as set forth in claim 16, wherein the sealing ledge extends in a radial direction inwardly of the skirt a distance less than the radius of the end wall.*

*26. A dispensing cap as set forth in claim 16, wherein areas of the lower side of the end wall radially inward of the sealing ledge are above the plane of the sealing ledge.*

*27. A dispensing cap as set forth in claim 16, wherein the axial thickness of the end wall at the sealing ledge is greater than the nominal wall thickness of the cap.*

*28. A dispensing cap as set forth in claim 16, the sealing ledge being capable of positively sealing the mouth of the container with a liner positioned in the cap regardless of any expected ovality.*

*29. A dispensing cap as set forth in claim 16, wherein the sealing ledge is capable of positively sealing the mouth of the container with a liner positioned in the cap regardless of any expected ovality.*

*30. A dispensing cap as set forth in claim 29, wherein the sealing ledge is formed by an underside of an area of the end wall having a thickness greater than other areas of the end wall.*

*31. A dispensing cap as set forth in claim 29, wherein areas of the end wall radially inward of the sealing ledge have a thickness less than an area of the end wall overlying the sealing ledge.*

*32. A dispensing cap as set forth in claim 29, wherein the sealing ledge extends in a radial direction inwardly of the skirt a distance less than the radius of the end wall.*

*33. A dispensing cap as set forth in claim 29, wherein areas of the lower side of the end wall radially inward of the sealing ledge are above the plane of the sealing ledge.*

*34. A dispensing cap as set forth in claim 29, wherein the axial thickness of the end wall at the sealing ledge is greater than the nominal wall thickness of the cap.*

*35. A two-mode dispensing cap for a container comprising an injection-molded thermoplastic one-piece body, the body having a generally circular end wall, the end wall having a spoon dispensing side and a shake dispensing side, the shake dispensing side including a plurality of relatively small apertures for dispensing therethrough a pourable product carried in the container, the spoon dispensing side including a relatively large aperture of a size sufficient for allowing passage of a spoon therethrough for spooning out product, each of said sides having an associated hinged flap, the flap of the shake side being arranged to selectively close or open relatively small apertures, the flap of the spoon side being arranged to selectively close said relatively large aperture, an internally threaded skirt depending from the perimeter of said end wall, an annular sealing ledge on the lower side of the end wall interior of said skirt, the sealing ledge having a flat surface extending radially a distance substantially equal to at least twice the nominal wall thickness of the cap, and catch structure for releasably retaining the spoon flap closed against accidental opening, the catch structure including surface area that produces a gripping action between an area on the end wall and an area on the spoon flap when the spoon flap is closed, the spoon flap area engaged in the gripping action underlying the end wall area engaged in the gripping action and thereby creating an axially interfering fit to hold said spoon flap closed.*

*36. A dispensing cap as set forth in claim 35, wherein said catch structure includes surface area arranged in a manner such that the catch structure is relatively tolerant of dimensional variations due to a tendency towards ovality.*

*37. A dispensing cap as set forth in claim 36, wherein the catch structure is dimensioned to provide a relatively large interference fit between an area of the end wall and an area of the spoon flap.*

*38. A dispensing cap as set forth in claim 35, wherein the end wall area engaged in the gripping action is complementary in form to the spoon flap area engaged in the gripping action.*

*39. A dispensing cap as set forth in claim 35, wherein the spoon flap area engaged in the gripping action, when the spoon flap is closed, and the end wall area engaged in the gripping action lie in generally radial planes.*

*40. A dispensing cap as set forth in claim 35, wherein the area of the end wall engaged in the gripping action is adjacent an edge of the end wall forming the spoon opening.*

*41. A dispensing cap as set forth in claim 35, wherein the catch structure is on the spoon flap.*

*42. A dispensing cap as set forth in claim 35, the sealing ledge being capable of positively sealing the mouth of the container with a liner positioned in the cap regardless of any expected ovality.*

*43. A dispensing cap as set forth in claim 35, wherein the sealing ledge is formed by an underside of an area of the end wall having a thickness greater than other areas of the end wall.*

*44. A dispensing cap as set forth in claim 35, wherein areas of the end wall radially inward of the sealing ledge have a thickness less than an area of the end wall overlying the sealing ledge.*

*45. A dispensing cap as set forth in claim 35, wherein the sealing ledge extends in a radial direction inwardly of the skirt a distance less than the radius of the end wall.*

*46. A dispensing cap as set forth in claim 35, wherein areas of the lower side of the end wall radially inward of the sealing ledge are above the plane of the sealing ledge.*

*47. A dispensing cap as set forth in claim 35, wherein the axial thickness of the end wall at the sealing ledge is greater than the nominal wall thickness of the cap.*

*48. A dispensing cap as set forth in claim 35, wherein the sealing ledge is capable of positively sealing the mouth of the container with a liner positioned in the cap regardless of any expected ovality.*

*49. A dispensing cap as set forth in claim 48, wherein the sealing ledge is formed by an underside of an area of the end wall having a thickness greater than other areas of the end wall.*

*50. A dispensing cap as set forth in claim 48, wherein areas of the end wall radially inward of the sealing ledge have a thickness less than an area of the end wall overlying the sealing ledge.*

*51. A dispensing cap as set forth in claim 48, wherein the sealing ledge extends in a radial direction inwardly of the skirt a distance less than the radius of the end wall.*

*52. A dispensing cap as set forth in claim 48, wherein areas of the lower side of the end wall radially inward of the sealing ledge are above the plane of the sealing ledge.*

*53. A dispensing cap as set forth in claim 48, wherein the axial thickness of the end wall at the sealing ledge is greater than the nominal wall thickness of the cap.*

* * * * *